US012043692B2

(12) United States Patent
Schulze et al.

(10) Patent No.: US 12,043,692 B2
(45) Date of Patent: Jul. 23, 2024

(54) POLYURETHANE-FOAMED FORMULATIONS AND NOISE INSULATIONS WITH FOAMS BASED THEREON

(71) Applicant: ADLER PELZER HOLDING GMBH, Hagen (DE)

(72) Inventors: Volkmar Schulze, Schierling (DE); Helmut Becker, Bochum (DE)

(73) Assignee: ADLER PELZER HOLDING GMBH (DE)

( * ) Notice: Subject to any disclaimer, the term of this patent is extended or adjusted under 35 U.S.C. 154(b) by 158 days.

(21) Appl. No.: 17/298,509

(22) PCT Filed: Nov. 11, 2019

(86) PCT No.: PCT/EP2019/080857
§ 371 (c)(1),
(2) Date: May 28, 2021

(87) PCT Pub. No.: WO2020/108971
PCT Pub. Date: Jun. 4, 2020

(65) Prior Publication Data
US 2022/0025099 A1 Jan. 27, 2022

(30) Foreign Application Priority Data
Nov. 28, 2018 (DE) .................... 10 2018 130 176.6

(51) Int. Cl.
| C08G 18/08 | (2006.01) |
| C08G 18/12 | (2006.01) |
| C08G 18/18 | (2006.01) |
| C08G 18/20 | (2006.01) |
| C08G 18/28 | (2006.01) |
| C08G 18/30 | (2006.01) |
| C08G 18/40 | (2006.01) |
| C08G 18/42 | (2006.01) |
| C08G 18/48 | (2006.01) |
| C08G 18/76 | (2006.01) |
| C08J 9/00 | (2006.01) |

(52) U.S. Cl.
CPC ............ *C08G 18/14* (2013.01); *C08G 18/12* (2013.01); *C08G 18/18* (2013.01); *C08G 18/2865* (2013.01); *C08G 18/302* (2013.01); *C08G 18/4018* (2013.01); *C08G 18/4208* (2013.01); *C08G 18/4829* (2013.01); *C08G 18/485* (2013.01); *C08G 18/7657* (2013.01); *C08J 9/0061* (2013.01); *C08G 2110/0008* (2021.01); *C08G 2110/005* (2021.01); *C08G 2110/0058* (2021.01); *C08G 2350/00* (2013.01); *C08J 2375/06* (2013.01); *C08J 2375/08* (2013.01)

(58) Field of Classification Search
CPC .................. C08G 18/4018; C08G 18/4829
See application file for complete search history.

(56) References Cited

U.S. PATENT DOCUMENTS

| 2,838,473 | A | 6/1958 | Partansky et al. ............. 260/57 |
| 2,938,884 | A | 5/1960 | Chern ............................ 260/58 |
| 3,470,118 | A | 9/1969 | Forster ......................... 260/2.5 |
| 3,686,101 | A | 8/1972 | David et al. .................. 260/2.5 |
| 4,046,721 | A | 9/1977 | Austin et al. .................. 260/2.5 |
| 4,789,690 | A | 12/1988 | Milovanovic-Lerik ...................... C08L 63/00 |
| 5,063,253 | A | 11/1991 | Gansen et al. .......... C08G 18/00 |
| 8,906,975 | B1 | 12/2014 | Dounis et al. ................ 421/128 |
| 2004/0029987 | A1* | 2/2004 | Sawai ..................... C08G 18/10 521/155 |
| 2006/0052467 | A1 | 3/2006 | Pignagnoli ................. C08J 9/08 |
| 2008/0015275 | A1 | 1/2008 | Karami et al. ................ 521/160 |
| 2009/0264547 | A1 | 10/2009 | Klesczewski et al. ....... 521/156 |
| 2011/0201705 | A1 | 8/2011 | Okumura ........... C08G 18/5027 |
| 2012/0009407 | A1 | 1/2012 | Peeler et al. .................. 428/220 |
| 2014/0315129 | A1 | 10/2014 | Kidnie ...................... B41C 1/00 |
| 2015/0065592 | A1 | 3/2015 | Girotti ................ C08G 18/092 |
| 2015/0099851 | A1 | 4/2015 | Pinto et al. ........... C08F 216/10 |
| 2017/0260319 | A1 | 9/2017 | Ishmael, Jr. et al. ...................... C08G 18/6685 |
| 2017/0313806 | A1* | 11/2017 | Yu ........................ C08G 18/18 |
| 2018/0051121 | A1 | 2/2018 | Micheletti et al. ... C08G 18/482 |
| 2019/0119460 | A1* | 4/2019 | Tomovic ............ C08G 18/4837 |
| 2021/0301069 | A1* | 9/2021 | Meng ................... A47C 27/002 |
| 2022/0025099 | A1 | 1/2022 | Schulze ................ G08G 18/12 |

FOREIGN PATENT DOCUMENTS

| CN | 101959959 | 1/2011 | ............. C08L 71/00 |
| CN | 105111997 | 12/2015 | ............ C09J 175/14 |
| CN | 107531873 | 1/2018 | ............. C08G 18/76 |
| DE | 40 01 044 | 7/1991 | ............. C08L 71/02 |
| DE | 100 04 427 | 10/2001 | ............. C08G 18/36 |
| JP | H01263110 | 10/1989 | ............. C08G 18/66 |
| WO | WO 00/73368 | 12/2000 | ................ C08J 9/12 |

(Continued)

OTHER PUBLICATIONS

Office Action issued in related U.S. Appl. No. 17/298,510, dated Jan. 31, 2023, 13 pages.
International Search Report and Written Opinion issued in PCT/EP2019/080857, with English translation, dated Feb. 13, 2029, 17 pages.
Notice of Reason for Refusal issued Japanese Patent Appln. Seria. No. 2021-530087, dated Sep. 13, 2023, with English translation, 9 pages.
First Office Action issued in Chinese Patent Appln. Serial No. 2019800905368, dated Aug. 16, 2022, with English translation, 14 pages.
First Office Action issued in Chinese Patent Appln. Serial No. 2019800905090, dated Sep. 20, 2022, with English translation, 12 pages.

(Continued)

*Primary Examiner* — Melissa A Rioja
(74) *Attorney, Agent, or Firm* — HAYES SOLOWAY P.C.

(57) ABSTRACT

Disclosed is a polyurethane foam formulation based on conventional polyether and polyester polyols based on renewable raw materials, with in particular MDI, for the production of preferably viscoelastic PUR moulded foams and sound insulations with foams based thereon.

17 Claims, No Drawings

(56) References Cited

FOREIGN PATENT DOCUMENTS

| WO | 2017207687 | 12/2017 | ............. C08G 18/48 |
| WO | WO 2018/022368 | 2/2018 | ............. C08J 11/24 |
| WO | WO 2018/165844 | 9/2018 | |
| WO | 2018206620 | 11/2018 | ............. B60C 19/00 |
| WO | WO 2019/194966 | 10/2019 | ............. C08G 18/50 |

OTHER PUBLICATIONS

German Search Report issued in German Patent Appln. Serial No. 10 2018 130 184.7, dated Sep. 26, 2019, with machine English translation, 7 pages.
German Search Report issued in German Patent Appln. Serial No. 10 2018 130 176.6, dated Sep. 30, 2019, with machine English translation, 7 pages.
International Preliminary Report in Patentability issued in PCT/EP2019/080863, dated May 25, 2021, 7 pages.
International Search Report and Written Opinion issued in PCT/EP2019/080863, with English translation, dated Feb. 4, 2020, 19 pages.
International Preliminary Report in Patentability issued in PCT/EP2019/080857, dated May 25, 2021, 7 pages.
International Search Report and Written Opinion issued in PCT/EP2019/080857, with English translation, dated Feb. 13, 2020, 17 pages.
"Cardolite—Chemistry for Tomorrow" Adhesive Product Overview, Oct. 2017, 14 pages.
Ullmann's Encyclopedia of Industrial Chemistry: "Polyurethanes" 2005, Wiley-VCH Vering GmbH & Co, KGaA, Weinheim doi: 10.1002/14356007.a21.665.pub2, 56 pages.

* cited by examiner

POLYURETHANE-FOAMED FORMULATIONS AND NOISE INSULATIONS WITH FOAMS BASED THEREON

BACKGROUND OF THE INVENTION

The subject matter of the invention is a polyurethane foam formulation based on conventional polyether and polyester polyols (hybrid formulation) based on renewable raw materials with MDI for the production of preferably viscoelastic polyurethane (PUR) moulded foams and sound insulation with foams based thereon.

Soft-elastic as well as visco-elastic polyurethane moulded foams are widely used in the field of vehicle acoustics. Common soft-elastic foams are generally classified as the "high resilience" type and have a pronounced spring characteristic with spontaneous or fast recovery behaviour. This contrasts with viscoelastic foam types, which are distinguished from soft-elastic foam types by their delayed recovery behaviour after pressure deformation. In comparison to "high resilience" foams, viscoelastic foams usually achieve significantly better damping properties.

In contrast to soft-elastic or viscoelastic foams typically produced in the slabstock foam process, which are used in the mattress or upholstery industry, acoustically effective components in the field of vehicle acoustics are preferably produced directly as moulded parts with the desired component geometry. As a rule, two-component systems are used for this purpose, wherein one component of the reactive system being various (poly)-isocyanates, and the second component consisting of a complex mixture of mostly different polyols, blowing agents, catalysts, stabilisers and possibly other additives.

The typical material properties of these foams are primarily determined by the polyol types used, their quantity distribution, the degree of cross-linking and the selected density. With regard to the intended use, but also taking into account frequent incompatibilities, either polyester or polyether polyols are used. In the field of sound insulation, foams based on polyether polyols and MDI predominate.

The respective polyols differ essentially in terms of functionality, reactivity and molecular mass, wherein the functionality and basic structure is directly determined by the starter molecule used. As a chemical blowing agent, water is usually added to the polyol component, wherein the water reacts with the (poly)-isocyanate and carbon dioxide is released, which acts as the actual blowing agent.

Soft elastic foams are used in different designs for equally different acoustic applications. The applications range from pure absorbers to spring-mass structures. The insulating effect increases depending on the density or the combined mass layer. Compared to soft-elastic "high resilience" types, viscoelastic moulded foams are usually characterised by better damping properties and are therefore preferred, in particular in the premium sector. This special viscoelastic material behaviour can be divided into pneumatic effects and structural properties, but mostly represents a combination of both. The so-called pneumatic ("asthma") effect is based on very small pore size, often also in combination with not completely open cell structure, which slows down the air exchange during compression as well as during recovery. The structural properties result from the combination of soft and hard segments within the polymer matrix and can be controlled accordingly via the quantity distribution of different functional polyols as well as the primary parameters mentioned.

Numerous different combinations of polyether polyols are known to produce soft-elastic or visco-elastic moulded foams. The transition from soft elastic to viscoelastic is smooth. This means that apparently clearly bouncy-elastic foams can already exhibit measurably viscoelastic material properties. The loss factor, measured according to the vibrometer method, has established itself as a measurable variable. As a rule of thumb, the higher the loss factor, the more likely it is that the typical viscoelastic material behaviour is also haptically recognisable. For sound insulation applications, a higher loss factor usually also means better damping properties.

In addition to the loss factor, the corresponding modulus of elasticity plays a decisive role. Thus, despite a high loss factor, comparably harder foams can have worse acoustic insulation properties than foams with a low loss factor but significantly lower hardness. The known material compositions of different polyether polyols, often marketed specifically for use in viscoelastic foams, show an expected dependence on modulus of elasticity, loss factor and MDI index. In order to obtain a sufficient number of hard segments in the case of viscoelastic foams, a correspondingly high degree of cross-linking, i.e. a high MDI index, is necessary. At the same time, however, this tends to lead to higher strength or increased modulus of elasticity.

The efficiency of foamed, acoustically effective automotive trim parts is determined by the respective component concept as a whole, in particular by the special properties of the foam systems used. The acoustic efficiency is basically divided into two categories: absorption and insulation. The degree of absorption of a moulded foam component is primarily dependent on the porosity and size of the surface open to the sound and the inner cell morphology (cell size and distribution, number and ratio of open and closed cells), which in turn significantly influence the performance-determining properties of flow resistance and tortuosity.

In comparison, the insulation properties of moulded foams are determined by their density and elastic spring properties. In addition to the hardness or, in this case, the softness of the foam, the elasticity behaviour plays a decisive role. Both elastic and viscoelastic foam types are known, wherein viscoelastic versions in particular achieve a significantly better insulation effect in soft settings due to the higher insulation—expressed as a loss factor—than elastic foams in comparable settings with regard to hardness and moulded density. In order to increase the (sheet) damping properties of such foams, corresponding mass layers are usually used analogous to highly elastic foams and combined and back-foamed into so-called spring-mass elements. The acoustic effectiveness of the overall structure is then still determined by the above-mentioned properties of the spring (moulded foam), but additionally by the properties of the mass layer (weight per unit area, flexural softness). In this combination, a higher weight per unit area with the same backfoaming generally leads to improved damping of vibrating elements, which in the automotive sector are usually metal sheets. Often the sheets themselves are structurally calmed and additionally equipped with (heavy) damping foils to improve the acoustic behaviour. However, this measure leads directly to a higher vehicle weight. The same applies to a higher weight per unit area of the mass layer in spring-mass structures, wherein in this case only the mass is shifted from the sheet metal to the acoustic component. This disadvantage is to be solved with the present invention by significantly increasing the performance with regard to the loss factor of the moulded foam through the use of special formulations using polyether polyols and plant-based polyester polyols, but without hardening the foam. The optimised insulation effect of the foam should enable the significant reduction or elimination of the mentioned sheet metal damping and/or reduced weights per unit area for spring-mass elements.

SUMMARY OF THE INVENTION

The aforementioned problem is solved in a first embodiment of the invention by a polyurethane foam formulation for the production of viscoelastic PUR moulded foams, comprising:
- a) a polyester polyol having a hydroxyl functionality of 2, a hydroxyl value in the range from 50 to 150 mgKOH/g, in particular a hydroxyl value from 65 to 90 mgKOH/g,
- b) optionally a polyether polyol having a hydroxyl functionality of 3, a hydroxyl value in the range from 180 to 250 mgKOH/g, in particular a hydroxyl value from 220 to 240 mgKOH/g,
- c) a polyether polyol having a hydroxyl functionality of 3, a hydroxyl value in the range from 20 to 40 mgKOH/g, in particular a hydroxyl value of 30 to 35 mgKOH/g,
- d) a block/copolymer having a hydroxyl value in the range from 25 to 45 mgKOH/g, in particular a hydroxyl value of 30 to 40 mgKOH/g, and
- e) a combination of catalytically active and stabilising additives.

In order to be able to specify the above-mentioned polyols, the above-mentioned different parameters have crystallised in the prior art:
- i.) the hydroxyl functionality, which depends on the starter molecule on which the polyether polyol is synthesised;
- ii.) the hydroxyl or OH number, which is a measure of the content of hydroxyl groups and is given in mg KOH/g. It is determined according to DIN 53240;
- iii.) the molecular mass (Mw), which is a measure of the length of the polyoxyalkylene chains of the polyether polyols. The above-mentioned quantities can be related to each other using the following equation:

$$56100 = OH \text{ number} - (Mw/\text{hydroxyl functionality}).$$

The polyols used differ in the starter molecule used, the resulting functionality, the molecular mass and the reactivity. In addition, specific modifications of the material behaviour via the isocyanate component are also possible, e.g. using pre-polymers.

The aim of the present invention is to reverse the negative dependence of loss factor and degree of cross-linking in terms of the desired acoustic effectiveness by using more suitable components and, in particular, to significantly increase the loss factor of the moulded foams produced in this way. The significantly improved insulation effect of these moulded foams thus represents the functional basis for sound insulation made from them. In contrast to the known reactive systems based either purely on polyether or polyester polyols, the present invention uses a flybrid formulation in which conventional, petroleum-based polyether polyols are optionally combined with polyester diols based on renewable raw materials, in this case CNSL (Cashew Nut Shell Liquid), resulting in significantly better acoustically effective material properties.

DETAILED DESCRIPTION OF THE INVENTION

Primary, the special structure of the CNSL-based polyester diols, in particular the characteristic, natural presence of hard segments in the form of an aromatic ring directly accessible via a hydroxyl group, but also the comparatively high reactivity of these polyester polyols means that even at a low MDI index, a comparatively significantly higher loss factor can be achieved in combination with a comparatively low modulus of elasticity. This leads to significantly better acoustic material properties than when using conventional pure systems, even with the same overall system adjustment—i.e. the same MDI index as well as the same moulded density. This makes it possible, for example, to reduce the weight per unit area to the point of eliminating all damping foils or significantly weight-reduced mass layers in typical spring-mass elements with at least the same acoustic behaviour, or to significantly improved performance in high-end applications where the special focus is on noise comfort and the construction weight plays a rather subordinate role.

At the same time, it enables the user to contribute to sustainability, because the starting material is based on renewable raw materials, which, however, unlike many other products based on vegetable oils, are not in competition with food procurement, but are obtained as a natural by-product.

The formulations according to the invention are based on polyether polyols. Blending with the CNSL-based polyester polyol results in said flybrid formulations. In the field of application of acoustic components for the automotive sector, it is customary to use formulations that are pure in type, i.e. either polyether or polyester compositions, which have typical advantages and disadvantages depending on the intended use.

The polyester polyol used to prepare the hybrid formulations is preferably a polyester diol derived from CNSL (Cashew Nutshell Liquid). Type designation Cardo-lite® NX-9203 (product of Cardolite Corporation), difunctional, with a hydroxyl value 98 mgKOH/g, viscosity of 2650 cps at 25° C. and a calculated content of renewable raw materials of 69%.

The polyether polyols b), c) and d) according to the invention are preferably produced by polymerisation of epoxides such as ethylene oxide, propylene oxide, butylene oxide, tetrahydrofuran, styrene oxide or epichlorohydrin with themselves or by addition of these epoxides, optionally in a mixture or successively, to starting components with reactive hydrogen atoms such as water, alcohols, ammonia or amines.

Particularly preferred among the epoxides mentioned above are ethylene oxide and propylene oxide. Very preferably, the polyether polyols used are composed only of propylene oxide as the epoxide component.

If several epoxides are used for the synthesis of the polyether polyols, the latter may have any desired arrangement of the oxyalkylene units. Thus, they can be homopolymers (when only one epoxide is used), copolymers d), "random" copolymers, "capped" polymers or polymers "tipped" with a mixture of different epoxides to achieve a desired content of primary hydroxyl groups.

Renewable raw materials within the meaning of the present invention are understood to be compounds occurring in nature and which can also be isolated in this form.

For the purposes of the present invention, not derived from a renewable raw material means that the carbon skeleton of the renewable raw material in question is no longer contained within the polyether polyol of component (b). In particular, this means that said polyether polyol is not obtained by, for example, reacting a renewable raw material with epoxides to form a polyether polyol.

Examples of possible renewable raw materials are castor oil, polyhydroxy fatty acid, ricinoleic acid, oils modified with hydroxyl groups such as grape seed oil, black cumin oil, pumpkin seed oil, borage seed oil, soybean oil, wheat germ oil, rapeseed oil, sunflower oil, peanut oil, apricot kernel oil, pistachio oil, almond oil, olive oil, macadamia nut oil, avocado oil, sea buckthorn oil, sesame oil, hemp oil, hazelnut oil, evening primrose oil, wild rose oil, safflower oil, walnut oil, fatty acids modified with hydroxyl groups and fatty acid esters based on myristic acid, palmitoleic acid, oleic acid, vaccenic acid, pertoselic acid, gadoleic acid, erucic acid, nervonic acid, linoleic acid and linoleic acid, stearidonic acid, arachidonic acid, timnonic acid, clupanodonic acid, cervonic acid.

The above-mentioned renewable raw materials also include chemically modified compounds in which, however, the connectivity of the carbon skeleton itself remains unchanged (e.g. renewable raw materials modified with hydroxyl groups, produced, for example, by hydroxylation of compounds or hydrogenated products).

Possible starter compounds are, for example, dicarboxylic acids such as succinic acid, adipic acid, phthalic acid and terephthalic acid.

Other possible starter compounds that may be used include, for example, ammonia or aliphatic and/or aromatic amines, which may optionally be substituted, such as N-monoalkyl-, N,N-dialkyl- and/or N,N'-dialkyl-substituted diamines. They have at least one primary or secondary amino group, such as 1,2-diaminoethane, oligomers of 1,2-diaminoethane (for example diethylenetriamine, triethylenetetramine or pentaethylenehexamine), 1,3-diaminopropane, 1,3-diaminobutane, 1,4-diaminobutane, 1.2-diaminohexane, 1,3-diaminohexane, 1,4-diaminohexane, 1,5-diaminohexane, 1,6-diaminobenzene, 2,3-diaminotoluene, 2,4-diaminotoluene, 3,4-diaminotoluene, 2,5-diaminotoluene, 2,6-diaminotoluene, 2,2'-diaminodiphenylmethane, 2,4'-diaminodiphenylmethane, 4,4'-diaminodiphenylmethane or aromatic amines obtained by acid-catalysed condensation of aniline with formaldehyde. Further suitable starter molecules include alkanolamines, such as ethanolamine, N-methyl- and N-ethylethanolamine, dialkanolamines, such as diethanolamine, N-methyl- and N-ethyldiethanolamine and trialkanolamines, such as triethanolamine.

Further suitable starter compounds include those having two or more hydroxyl groups, such as water, 1,2-ethanediol, 1,2-propanediol, 1,3-propanediol, diethylene glycol, dipropylene glycol, triethylene glycol, tripropylene glycol, 1,2-butanediol, 1,3-butanediol, 1,4-butanediol, 1.2-hexanediol, 1,3-hexanediol, 1,4-hexanediol, 1,5-hexanediol, 1,6-hexanediol, glycerol, trimethylolpropane, pentaerythritol, sorbitol and sucrose, castor oil, modified soybean oil. The starter compounds can be used alone or as mixtures.

Preferably, the mass fractions of components (a) to (d) (optionally independently of each other) are in the following amounts: (a) 10 to 45% by weight, in particular preferably 20 to 30% by weight; (b) 0 to 55% by weight, in particular preferably 5 to 20% by weight; (c) 40 to 75% by weight, in particular preferably 50 to 70% by weight; and (d) 5 to 50% by weight, in particular preferably 5 to 20% by weight. The data in % by weight refer in each case to the total mass of the polypolyol composition. These proportions by weight are preferred in that they result in a particularly high viscoelasticity in the polyurethane foam according to the invention.

Particularly preferably, a triol is used as the starter molecule in components (b) and (c), in particular glycerol. In the case of component (d), a 1,2-diol is preferably used as the starter molecule, in particular propylene glycol.

Manufacture of Mouldings:

Floor Covering Insulation:

For the area with increased insulation requirements/omission or reduced weight per unit area of the anti-drumming films.

Taking into account the correlation of acoustic effectiveness–available installation space/weight/footfall resistance, the foam properties are adjusted here. When adjusting the adhesion of the foam surface, the floor paneling installation conditions must be taken into account.

Interior Bulkhead:

The development of ever more powerful engines simultaneously leads to higher noise generation, which must be isolated in the interior, especially via the bulkhead cladding. This required more powerful components, which can be efficiently represented by spring-mass constructions, especially those with high weights per unit area in the mass layer. At the same time, among other things, the trend towards increasingly complex networking up to autonomous and smart concepts and the additional components required for this leads to ever smaller installation space available for the actual bulkhead insulation. As a result, these components are becoming thinner and thinner and the lack of (in this case foam) volume or layer thickness requires (acoustically) particularly effective foam systems. A viscoelastic flexible foam based on the described hybrid formulation compensates for the missing insulation volume due to the very high loss factor and thus enables comparatively compact insulation concepts that cannot be realised with conventional systems. Furthermore, concepts can be realised that enable a significantly lighter mass layer with the same size of foam insulation.

(e)—Motor Capsule:

An acoustically effective motor capsule for e-motors, e.g. in Tesla, Model S, is known to be constructed of PUR soft foam and heavy foil. To achieve the required effectiveness of the spring-mass structure, a high weight per unit area of the heavy foil is necessary. Especially due to the loss factor of the hydride formulation, which can be set very high in comparison, a significant improvement of the acoustic effect is achieved. At the same time, weight can be saved on the part of the heavy foil, which is an important requirement not only for electric vehicles. The CNSL-based polyester diol and its ring structure increase the temperature stability and improve the safety-relevant burning behaviour.

High variation of adjustable material properties, wherein primarily using the selected polyester diol Cardolite® NX-9203 for modelling the viscoelastic behaviour.

| Adjustable foam properties | | visco-modified | highly viscoelastic |
|---|---|---|---|
| Density | 45 to 120 kg/m$^3$ | 45 to 75 | 70 to 110 |
| storage modulus | 40 to 600 kl\l/m$^2$ | 60 to 90 | 100 to 600 |
| Dissipation factor | 0.1 to 0.8 | 0.1 to 0.26 | 0.4 to 0.6 |

Weight reduction with regard to the entire component concept, $CO_2$ reduction through weight saving and (proportionate) use of renewable raw materials, compact insulation, improved combustion behaviour enables reduction/elimination of additional flame retardants.

The use of mixed (hybrid) systems containing both conventional polyethers and polyester polyols, especially polyester diols based on CNSL, optimised for use in viscoelastic moulded soft foams and the special viscoelastic material properties determined by the polyester diol used (Cardolite® NX-9203). Compared to conventional "pure-bred" system solutions, the soft foams obtained in this way are characterised by a high to extremely high loss factor, which enables a significant reduction in the required mass layer, especially when used in spring-mass elements. Design examples The base polyol was Voranol® CP6001 (DOW Chemicals), molecular mass 6000 g/mol, OH functionality=3, hydroxyl value 28 to 32 mgKOH/g, an ethoxylated/propoxylated polyether polyol based on glycerol.

In addition, a glycerol-based polyoxyalkylene triol was used (depending on the embodiment), trade name Rokopol® V700 (from PCC Ro-kita), OH functionality=3, hydroxyl value 225 to 250 mgKOH/g, molecular weight 700 g/mol, which is often used in conventional, purely polyether polyol-based viscoelastic systems to demonstrate the viscoelastic material properties.

Rokopol® MI 170 (PCC Rokita), a glycerol-based copolymer of ethylene oxide and propylene oxide, was used as the cell opener.

Specflex® NS540 (DOW Chemicals) was used as MDI component, NCO content 31.36 to 3532.57%, acidity 130 to 170 mg/kg, viscosity 38 to 60 mPa·s at 25° C.

RZETA® (Tosoh Corporation) is an amine-based reactive gel catalyst derived from TEDA and is actively incorporated into the PUR matrix via the OH group present.

Dabco® NE300 (Evonik, formerly Air Products) supported the water-isocyanate reaction as a so-called blowing or propellant catalyst and was reactively incorporated via the hydrogenacid NH group.

Tegostab® B8736LF2 is a representative of the low-fogging silicone surfactants used primarily for cell stabilisation, which also influence cell size and distribution and improve the miscibility of the components used.

Concentrol® STB-PU1259PF is also an emission-optimised stabiliser from Productos Concentrol.

EXAMPLE 1

Example of embodiment of highly viscoelastic moulded flexible foam according to the present invention (quantities in parts by weight).

Polyol Component (Flybrid Formulation)

| Voranol ® CP6001 | 50 | |
| Rokopol ® V700 | | 30 |
| Cardolite ® NX-9203 | 20 | |
| Rokopol ® MI 170 | 5.5 | |
| Water | 3.5 | |
| Tegostab ® B8736LF2 | | 0.4 |
| RZETA ® | | 1.4 |
| Dabco ® NE300 | | 0.4 |

Isocyanate component (Specflex® NS540), mixing ratio polyol:MDI=100:46, moulded density 82 kg/m³.

EXAMPLE 2

Example of an embodiment for viscoelastically modified moulded flexible foam (improved damping behaviour due to higher loss factor at the same density/avoidance of—from an acoustic point of view undesirable increase in foam hardness) in the sense of the present invention.

Polyol Component:

| Voranol ® CP6001 | 70 | |
| Cardolite ® NX-9203 | 30 | |
| Rokopol ® MI 170 | 5 | |
| Water | 5 | |
| Concentrol ® STB-PU1259PF | | 0.3 |
| RZETA ® | | 1.25 |
| Dabco ® NE300 | | 0.35 |

Isocyanate component (Specflex® NS540), mixing ratio polyol:MDI=100:53

The invention claimed is:

1. A polyurethane (PUR) foam formulation for the production of viscoelastic PUR molded foams comprising:
    a) a polyester polyol having a hydroxyl functionality of 2, and a hydroxyl value in the range of 50 to 150 mgKOH/g
    b) optionally, a polyether polyol having a hydroxyl functionality of 3, and a hydroxyl value in the range of 180 to 250 mgKOH/g
    c) a polyether polyol having a hydroxyl functionality of 3, and a hydroxyl value in the range of 20 to 40 mgKOH/g
    d) a block-copolymer having a hydroxyl value in the range of 25 to 45 mgKOH/g; and
    e) a combination of catalytic and stabilising additives,
    wherein the proportion of component (a) is 10 to 45% by weight, based on a total combined weight of all polyols in the formulation and the proportion of component (c) is 40 to 95% by weight, based on the total combined weight of all polyols in the formulation.

2. The formulation according to claim 1, wherein the proportion of component (a) is 20 to 30% by weight, based on the total combined weight of all polyols in the formulations.

3. The formulation according to claim 1, wherein the proportion of component (b) is 0 to 55% by weight, based on the total combined weight of all polyols in the formulations.

4. The formulation according to claim 1, wherein the proportion of component (d) is 2 to 10% by weight, based on the total combined weight of all polyols in the formulations.

5. The formulation according to claim 1, wherein the polyesterdiol is cashew nut shell liquid (CNSL)-based.

6. The formulation according to claim 1, wherein the polyether polyol of component (b) and/or component (c) is derived from glycerol.

7. The formulation according to claim 1, wherein the block-copolymer is an ethylene oxide and/or propylene oxide block-copolymer which is based on glycerol.

8. The formulation according to claim 1, wherein the catalytically active additives comprise at least one reactive group.

9. A process for the production of soft-elastic and viscoelastic moulded foams, said process comprising providing a mixture of
    (A) an isocyanate,
    (B) a formulation according to claim 1,
    (C) water, and
    (D) one or more catalysts; and
    (E) reacting components (A)-(D).

10. The process according to claim 9, wherein component (A) comprises diphenylmethane diisocyanate (MDI) or a prepolymer based on MDI with an NCO content in a range of 22 to 33% by weight.

11. The process according to claim 9, wherein component (A) comprises diphenylmethane diisocyanate (MDI) having an MDI index in a range from 50 to 100.

12. A viscoelastic foam obtainable by reaction injection molding, casting or slabstock foaming of the formulation according to claim 1.

13. The viscoelastic foam of claim 12, formed as a molded part.

14. The molded part according to claim 13, in the form of a sound insulation.

15. The process according to claim 10, wherein the component (A) has a NCO content in the range of 28 to 32% by weight.

16. The formulation according to claim 8, wherein the at least one reactive group is a hydrogen azide group.

17. The process according to claim 9, wherein (A) is a poly-isocyanate.

* * * * *